United States Patent [11] 3,607,060

| [72] | Inventor | Tatsuo Kuratomi<br>2-18, 4-chome, Hamatake Chigasaki-shi, Kanagawa-ken, Japan |
|---|---|---|
| [21] | Appl. No. | 804,312 |
| [22] | Filed | Mar. 4, 1969 |
| [45] | Patented | Sept. 21, 1971 |
| [32] | Priority | Mar. 11, 1968 |
| [33] | | Japan |
| [31] | | 43/15,414 |

[54] METHOD OF MANUFACTURING DIAMOND CRYSTALS
5 Claims, No Drawings

| [52] | U.S. Cl. | 23/209.1 |
|---|---|---|
| [51] | Int. Cl. | C01b 31/06 |
| [50] | Field of Search | 23/209.1, 209.1 D |

[56] References Cited
UNITED STATES PATENTS

| 2,947,609 | 8/1960 | Strong | 23/209.1 |
|---|---|---|---|
| 3,181,933 | 5/1965 | Wentorf | 23/209.1 |

FOREIGN PATENTS

| 1,049,182 | 11/1966 | Great Britain | 23/209.1 |

*Primary Examiner*—Edward J. Meros
*Attorney*—K. W. Brownell

ABSTRACT: Diamond crystals are produced by subjecting to elevated temperatures and pressures a mixture of a nondiamond form of carbon together with a mixture or alloy of cobalt and phosphorus, which serves as the solvent and catalyst for the conversion to diamond form. Use of cobalt and phosphorus for solvent and catalyst allows conversion of nondiamond carbon to diamond at lower pressures than previously utilized, i.e., from about 42,200 to about 49,000 atmospheres.

3,607,060

METHOD OF MANUFACTURING DIAMOND CRYSTALS

BACKGROUND OF THE INVENTION

This invention relates to a process of producing diamond crystals synthetically. More particularly, this invention relates to a process of producing diamond crystals synthetically by subjecting nondiamond carbon to elevated temperatures and pressures together with a metallic solvent and catalyst.

The synthetic production of diamond crystals has long been of great interest because of the scarcity of natural diamond and the many industrial uses for diamond. In prior art solvent processes, transition metals such as cobalt, nickel, iron, manganese and chromium which form somewhat unstable carbides have been employed as solvent and catalysts for the carbon which is to be transformed into the diamond form.

In all of these solvent processes, two reaction conditions must be satisfied. First, the nondiamond carbon or carbonaceous material must be subjected to pressure and temperature such that diamond is a thermodynamically stable form of carbon. This region is defined for temperatures above about 1,200° K. (927° C.) by the Berman-Simon line (R. Berman and F. E. Simon, Z. Electrochem. 59, 333–38 (1955)), which states that the minimum pressure necessary for diamond to be thermodynamically stable is defined by $P = 7,000 + 27\,T$, where $P$ is the pressure in atmospheres and $T$ is the temperature in degrees Kelvin.

The second condition to be satisfied is that there must be included solvent and catalyst sufficient to accomplish conversion, and the temperature and pressure must be sufficient for the solvent to melt and for the catalyst to be effective. As a result of this limitation, in combination with the Berman-Simon limitation, prior art processes have in general required a minimum temperature of about 1,200° C., and a minimum pressure of about 50,000 atmospheres.

This limitation is unfortunate, as the attainment of higher pressures reduces the volume of material which can be subjected to a given pressure. Furthermore, the use of higher pressures increases the risk of fracture in the apparatus.

It is, therefore, an object of this invention to provide a process of converting nondiamond carbon to diamond without the necessity of utilizing pressures and temperatures previously required.

SUMMARY OF THE INVENTION

According to the present invention, diamond crystals are produced by subjecting to elevated temperatures and pressures a mixture of nondiamond carbon, cobalt and phosphorus; cooling the resultant product; and separating the diamond crystals therefrom. As used herein, "nondiamond carbon" includes not only free carbon such as graphite, charcoal, coke, coal and amorphous carbon, but also chemically bound carbon, i.e., inorganic and organic compounds which decompose to yield free carbon when subjected to the reaction conditions. Although cobalt and phosphorus are mentioned separately, it will be clear that both mixtures of cobalt and phosphorus as well as alloys containing these metals can be used.

DETAILED DESCRIPTION

It is highly preferred that the nondiamond carbon employed in the process of this invention be free carbon, and graphite is especially preferred. The preferred pressure to be employed is between about 42,200 atmospheres and about 49,000 atmospheres, although higher pressures can be used if desired. The preferred temperature to be employed is between about 1,023° C. and about 1,150° C. Higher temperatures can be used if desired, however. It is preferred to use from about 1 percent to about 10 or 10.5 percent phosphorus in cobalt, i.e., the ratio of cobalt to phosphorus should preferably range from about 99:1 to about 9:1; a ratio of about 16:1 (i.e., about 6 percent phosphorus) is highly preferred. All percentages and ratios herein are by weight, except as noted. The ratio of carbon to cobalt preferably ranges from about 2:1 to about 1:1; a ratio of from about 1.25:1 to about 1:1 is most preferred. The process can be carried out in known apparatus which can bear up against temperatures of 1,150° C. and pressures of 49,000 atmospheres, for example apparatus of the types disclosed in U.S. Pat. Nos. 2,941,248 and 2,941,252, granted June 21, 1960 to H. T. Hall and H. D. Bovenkirk, respectively; or of my copending U.S. Pat. applications Ser. No. 645,996, now U.S. Pat. No. 3,492,695, filed June 14, 1967, and Ser. No. 767,976, filed Oct. 16, 1968. It is relatively easy to produce such apparatuses and also to enlarge the capacity of their reaction chambers. Accordingly, the process of this invention can be used in industrial mass production of diamond crystals, which are highly useful as abrasives. The ingredients of nondiamond carbon, cobalt and phosphorus are preferably granular or finely divided to permit greater homogeneity in the mixture and thus increase the efficiency of the process.

The invention is further illustrated by the following example.

EXAMPLE

One thousand milligrams of an alloy consisting of 94 percent cobalt and 6 percent phosphorus was mixed with 1,000 milligrams of high-purity graphite powder. This mixture was subjected to a pressure of about 45,621 atmospheres and a temperature of about 1,150° C. for about 90 minutes. The comparatively long reaction time was utilized to insure sufficient completion of the reaction under the comparatively low pressure and temperature conditions utilized. The apparatus used was of a known type, capable of 1,600° C. temperature and 80,000 atmospheres pressure.

After the reaction was completed as described, the pressure was released, the reaction mixture was allowed to cool, and 590 milligrams of diamond crystals were recovered.

Although it is not desired to be bound by any theory, it is believed that under the reaction conditions, a large part of the cobalt and all of the phosphorus are melted together to act as the solvent for the process, while a small portion of the cobalt remains in the solid state to act as catalyst.

I claim:

1. A process for producing diamond crystals, comprising the steps of
    1. subjecting to elevated temperature between about 1,023° C. and about 1,150° C., and pressure between about 42,200 atmospheres and about 49,000 atmospheres, a mixture of nondiamond carbon, cobalt and phosphorus, the ratio of cobalt to phosphorus ranging from about 99:1 to about 9:1, and the ratio of carbon to cobalt ranging from about 2:1 to about 1:1,
    2. cooling the resultant product, and
    3. separating the diamond crystals therefrom.
2. The process of claim 1 in which the pressure employed is about 45,620 atmospheres.
3. The process of claim 2 in which the temperature employed is about 1,150° C.
4. The process of claim 3 in which the ratio of cobalt to phosphorus is about 16:1.
5. The process of claim 4 in which the ratio of carbon to cobalt ranges from about 1.25:1 to about 1:1.